US008619995B2

(12) United States Patent
Haddad et al.

(10) Patent No.: US 8,619,995 B2
(45) Date of Patent: Dec. 31, 2013

(54) METHODS AND APPARATUS RELATED TO ADDRESS GENERATION, COMMUNICATION AND/OR VALIDATION

(75) Inventors: Wassim Michel Haddad, West New York, NJ (US); George Tsirtsis, London (GB); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 997 days.

(21) Appl. No.: 12/360,899

(22) Filed: Jan. 28, 2009

(65) Prior Publication Data

US 2010/0189264 A1 Jul. 29, 2010

(51) Int. Cl.
*H04L 9/08* (2006.01)

(52) U.S. Cl.
USPC .............................. 380/283; 380/28; 713/168

(58) Field of Classification Search
USPC ..................... 713/176; 380/28, 283
See application file for complete search history.

(56) References Cited

U.S. PATENT DOCUMENTS

| 5,497,423 | A |  | 3/1996 | Miyaji |  |
|---|---|---|---|---|---|
| 6,829,645 | B1 | * | 12/2004 | Hutton et al. | 709/227 |
| 7,203,837 | B2 | * | 4/2007 | O'Shea et al. | 713/170 |
| 7,546,456 | B2 | * | 6/2009 | Le et al. | 713/162 |
| 7,805,605 | B2 | * | 9/2010 | Takeda et al. | 713/156 |
| 7,925,027 | B2 | * | 4/2011 | Kempf et al. | 380/282 |
| 8,418,242 | B2 | * | 4/2013 | Zhang et al. | 726/14 |
| 2002/0152380 | A1 |  | 10/2002 | Oshea et al. |  |
| 2006/0077908 | A1 | * | 4/2006 | Park et al. | 370/254 |
| 2008/0291885 | A1 | * | 11/2008 | Miao et al. | 370/338 |

FOREIGN PATENT DOCUMENTS

| CN | 1741523 A | 3/2006 |
|---|---|---|
| JP | 2004341563 A | 12/2004 |

OTHER PUBLICATIONS

International Search Report and Written Opinion—PCT/US2010/022298—ISA/EPO—Jun. 30, 2010.
Taiwan Search Report—TW099102477—TIPO—Feb. 25, 2013.

* cited by examiner

*Primary Examiner* — Amare F Tabor
(74) *Attorney, Agent, or Firm* — James K. O'Hare

(57) ABSTRACT

Methods and apparatus for generating, communicating, and/or using sets of addresses corresponding to a communications device are described. A first communications device generates, from a public key and a random number, both a first address and a second address. The generated address pair is communicated to a second communications device along with proof of ownership information regarding the address pair via an address signaling message such as a binding update message. The second communications device processes the received address signaling message and determines address pair validity and/or address pair ownership information. The first address may be associated with a first network, e.g., an unsecure WAN network, while the second address may be associated with a second network, e.g., a secure peer to peer network. Decisions on switching between using the first address to using the second address may be based on address validity and/or address ownership determinations.

19 Claims, 16 Drawing Sheets

METHODS AND APPARATUS RELATED TO ADDRESS GENERATION, COMMUNICATION AND/OR VALIDATION

FIELD

Various embodiments relate to communications methods and apparatus, and more particularly, to methods and apparatus related to generating, communicating, and/or using sets of addresses.

BACKGROUND

In a communications system it may be desirable for a communications device to change its address or to have multiple addresses concurrently. For example the same device may desire to use different addresses in different regions or networks, and/or use different addresses when using different communications protocols, e.g., different airlink protocols.

It may be desirable for a communications device to be able to generate a set of multiple addresses for its use. For example, a first communications device in a session with a second communications device may desire to change from a first address to another address in which case more than one address will be used. There is a need for methods and apparatus which facilitate communication of address information in a manner that makes hijacking of a communications session difficult. In view of the above it should be appreciated that there is a need for methods and apparatus which allow for a device to have multiple addresses and/or which allow a device to communicate one or more addresses in a manner that makes it difficult to hijack a communications session which uses one or more of the multiple addresses.

SUMMARY

Methods and apparatus for generating, communicating, and/or using sets, e.g., pairs, of addresses corresponding to a communications device are described. The methods and apparatus make it difficult to hijack a communications session by signaling an address change. In some, but not necessarily all, embodiments, a communications device generates, from a public key and a random number, a first address for use in a first network using a first communications protocol and a second address for use in a second communications network using a second communications protocol. In one such embodiment, the first network is a wide area network (WAN), the second communications network is a peer to peer communications network, and the first communications protocol is different from the second communications protocol.

Various embodiments are also directed to the communication of generated address sets between communications devices along with proof of ownership information regarding the set of addressees, e.g., via an address signaling message such as a binding update message. In some such embodiments, an address signaling message includes multiple addresses, e.g., multiple Internet Protocol version 6 (IPv6) addresses, and a user certificate corresponding to the multiple addresses. Ownership of the multiple addresses, communicated in the address signaling message, can be confirmed by a device receiving the address signaling message upon validation of the certificate corresponding to the multiple addresses.

In some embodiments, the first communications network and the second communications network are unsecure networks. However, in other embodiments the first communications network is unsecure and the second communications network is secure. Various features of some embodiments support the capability to verify that a device which generated an address signaling message actually owns an address pair included in the address signaling message. Some embodiments include features that support the ability to confirm the address signaling message integrity, e.g., that the content was not altered after generation of the message. These features are useful in maintaining security and preventing hijacking of a communications session.

An exemplary method of operating a first communications device, in accordance with some embodiments, comprises generating a first M bit value and a second M bit value from a random number and a public key corresponding to a private key known to said first communication device, where M is a positive integer; generating a first address including said first M bit value; and generating a second address including said second M bit value. In some such embodiments, the exemplary method further comprises sending a first signal including said first address; and sending a second signal including said second address. A first communications device, in accordance with some embodiments, comprises at least one processor configured to: generate a first M bit value and a second M bit value from a random number and a public key corresponding to a private key known to said first communication device, where M is a positive integer; generate a first address including said first M bit value; generate a second address including said second M bit value; send a first signal including said first address; and send a second signal including said second address. The exemplary first communications device further comprises memory coupled to said at least one processor.

An exemplary method of operating a first communications device, in accordance with some embodiments, comprises: receiving, from a second communications device, an address signaling message including a public key corresponding to private key known to the second communications device, a random number and a signature corresponding to the second communications device, a first address, and a second address; and performing an address validation operation using the random number and public key to determine the validity of the first and second addresses. In some such embodiments, the exemplary method further comprises: using, when said first and second addresses are determined to be valid, at least one of said first or second addresses to communicate with said second communications device. A first communications device, in accordance with some embodiments, comprises: at least one processor configured to: receive, from a second communications device, an address signaling message including a public key corresponding to private key known to the second communications device, a random number and a signature corresponding to the second communications device, a first address, and a second address; and perform an address validation operation using the random number and public key to determine the validity of the first and second addresses. In some such embodiments, said at least one processor is further configured to use, when said first and second addresses are determined to be valid, at least one of said first or second addresses to communicate with said second communications device. The exemplary first communications device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
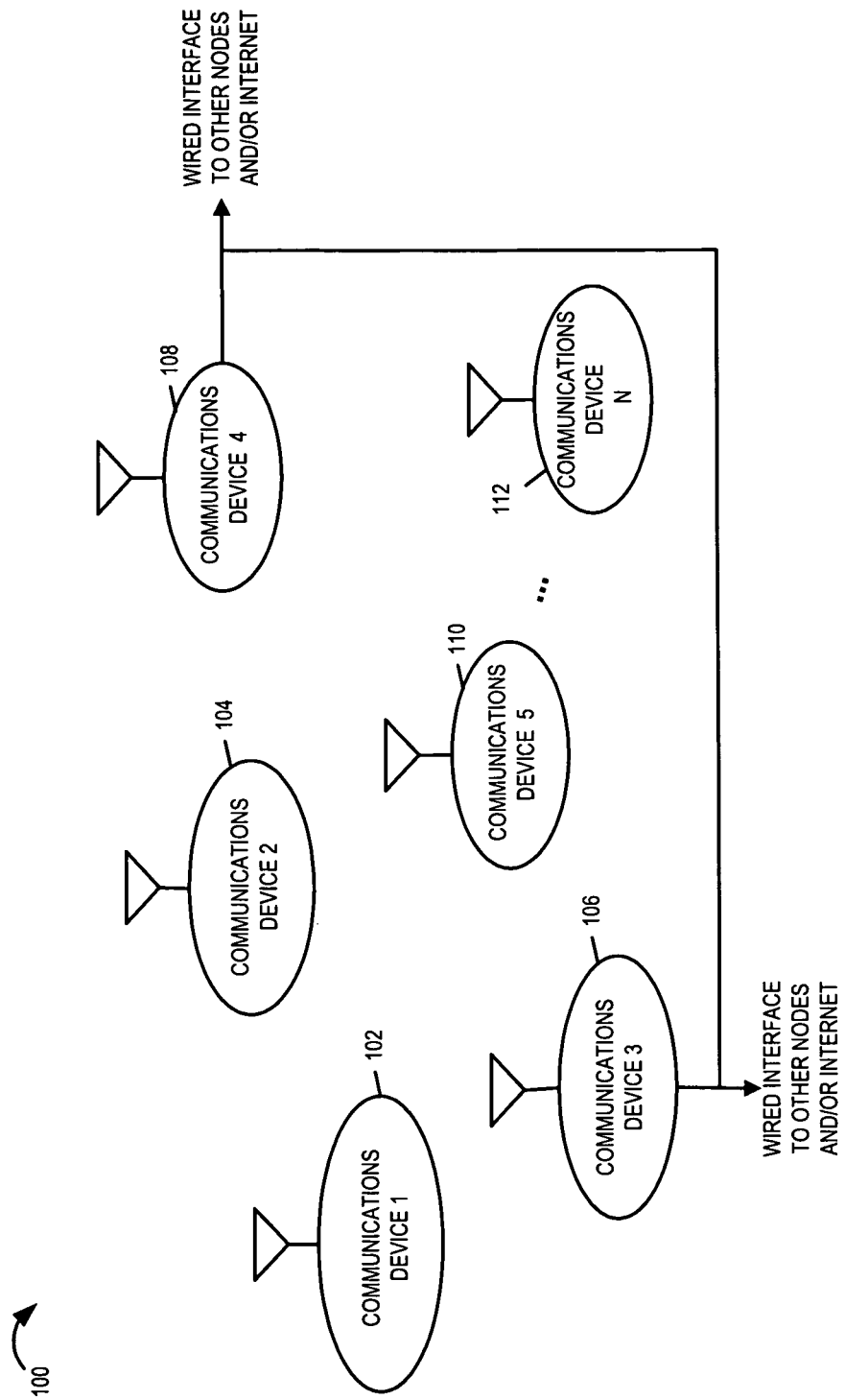
FIG. 1 is a drawing of an exemplary communications system in accordance with various embodiments.

FIG. 1 is a drawing of an exemplary communications system 100 in accordance with various embodiments. Exemplary communications system 100 includes a plurality of wireless communications devices (communications device 1 102, communications device 2 104, communications device 3 106, communications device 4 108, communications device 5 110, . . . , communications device N 112). Some of the communications devices, e.g., communications device 3 106 and communications device 4 108, include a wired interface, which couples the communications device to other nodes, a backhaul network and/or the Internet.

The communications devices (102, 104, 106, 108, 110, 112) of system 100 can generate sets of addresses and corresponding address ownership information, generate address signaling messages such as binding update messages, transmit generated address signaling messages, recover address signaling messages, and determine validity and/or ownership information regarding information communicated in received address signaling messages.

In some embodiments, a communications device, e.g., communications device 1 102, generates a pair of addresses, e.g., a pair of IPv6 address, with a first device 1 address associated with a first communications protocol and/or a first network and a second device 1 address associated with a second communications protocol and/or a second communications network. In some such embodiments, the communications device communicates its generated pair of addresses to another node, e.g., communications device 2 104, along with address pair ownership information, e.g., via an address signaling message such as a binding update message. The communications device receiving the address signaling message determines validity and/or ownership information regarding information communicated in the received address signaling message. In some embodiments, making a decision whether or not to handoff from the first device 1 address to the second device 1 address is based on the result of the validity and/or ownership determination.

Figure 2:
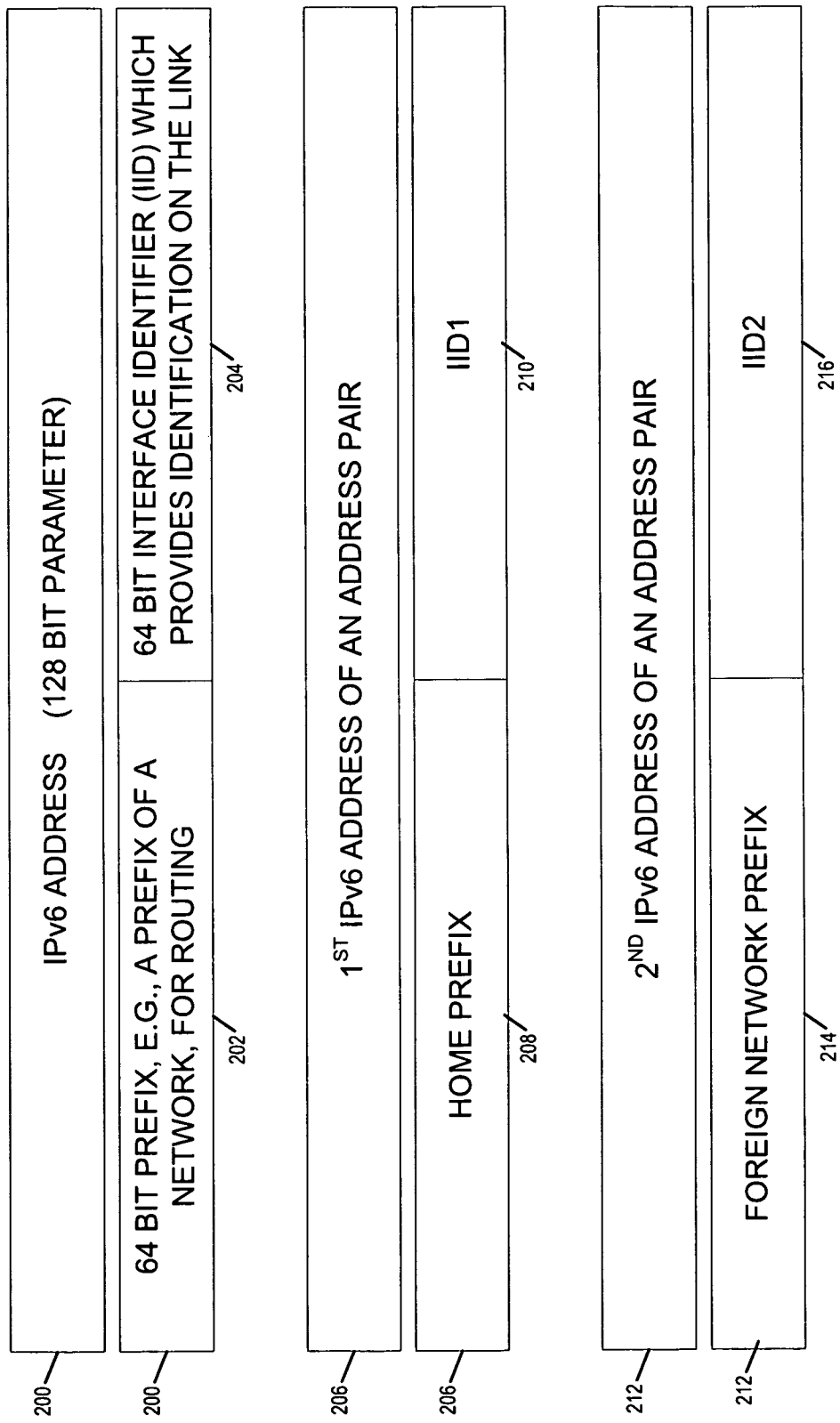
FIG. 2 is a drawing illustrating exemplary IPv6 address format information in accordance with various embodiments.

FIG. 2 is a drawing illustrating exemplary IPv6 address format information in accordance with various embodiments. Exemplary IPv6 address 200 is a 128 bit parameter including a 64 bit prefix 202 and a 64 bit interface identifier (IID) 204. The 64 bit prefix 202 is, e.g., a 64 bit prefix of a network which is used for routing. The 64 bit interface identifier (IID) 204 is, e.g., a value such as a random number which provides unique identification on the link.

In various embodiments, corresponding to a particular device a pair of IPv6 addresses is generated. For example, one exemplary IPv6 address pair includes 1st IPv6 address 206 and 2nd IPv6 address 212. 1st IPv6 address 206, which is the device's address for use in its home network, includes a 64 bit home prefix portion 208 and a corresponding 64 bit interface identifier, IID1 210. 2nd IPv6 address 212, which is the device's address for use in a particular foreign network, includes a 64 bit foreign network prefix 214 and a corresponding 64 bit interface identifier, IID2 216.

Figure 3:
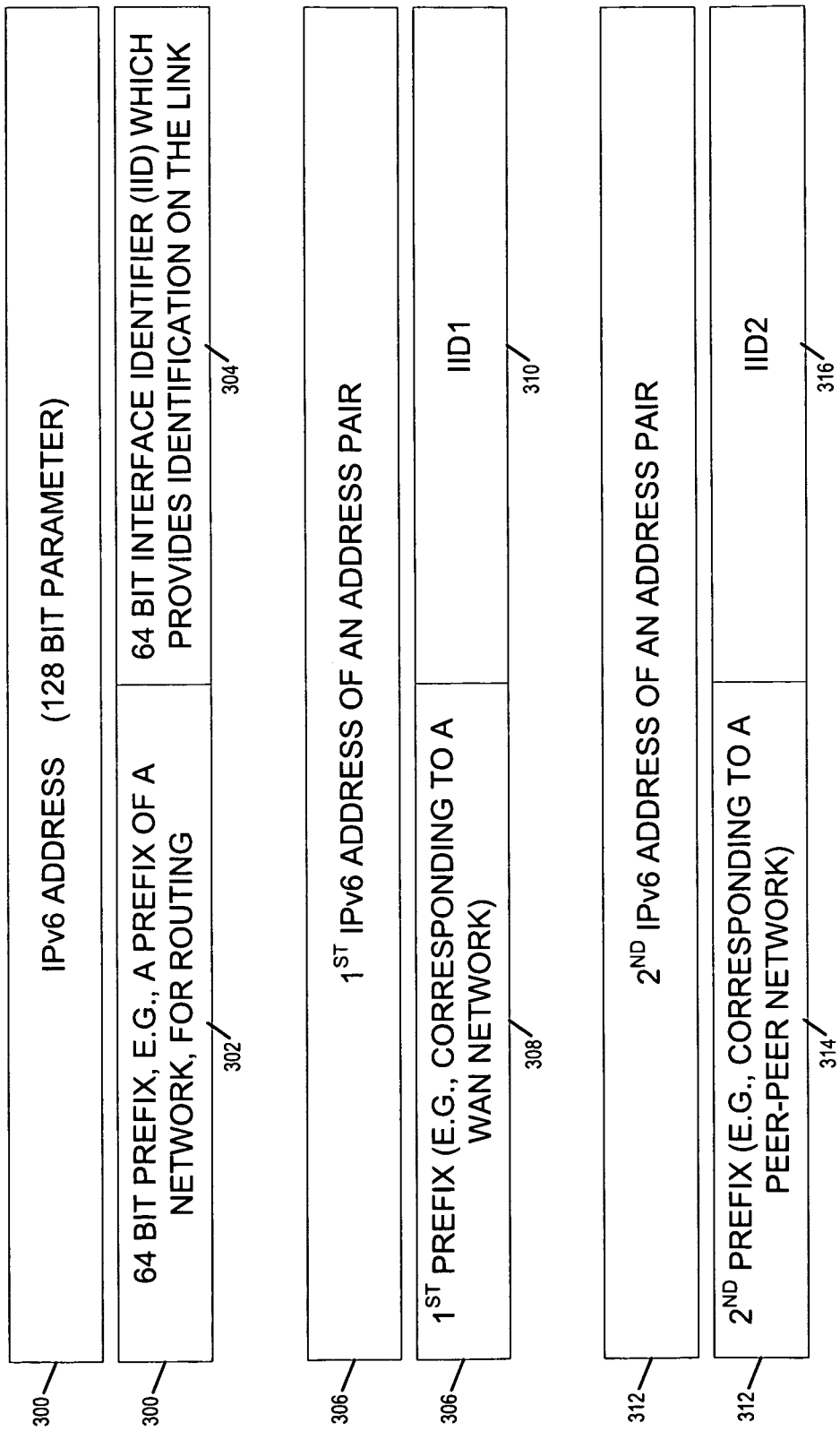
FIG. 3 is a drawing illustrating exemplary IPv6 address format information in accordance with various embodiments.

FIG. 3 is a drawing illustrating exemplary IPv6 address format information in accordance with various embodiments. Exemplary IPv6 address 300 is a 128 bit parameter including a 64 bit prefix 302 and a 64 bit interface identifier (IID) 304. The 64 bit prefix 302 is, e.g., a 64 bit prefix of a network which is used for routing. The 64 bit interface identifier (IID) 304 is, e.g., a value such as a random number which provides identification on the link.

In various embodiments, corresponding to a particular device a pair of IPv6 addresses is generated. For example, one exemplary IPv6 address pair includes 1st IPv6 address 306 and 2nd IPv6 address 312. 1st IPv6 address 306, which is the device's address for use in a first network, includes a 64 bit 1st prefix 308 and a corresponding 64 bit interface identifier, IID1 310. The first network is, e.g. a WAN network using a first communications protocol. 2nd IPv6 address 312, which is the device's address for use in a second network, includes a 64 bit prefix 314 and a corresponding 64 bit interface identifier, IID2 316. The second network is, e.g., a peer to peer network using a second communications protocol which is different from the first communications protocol.

Figure 4:
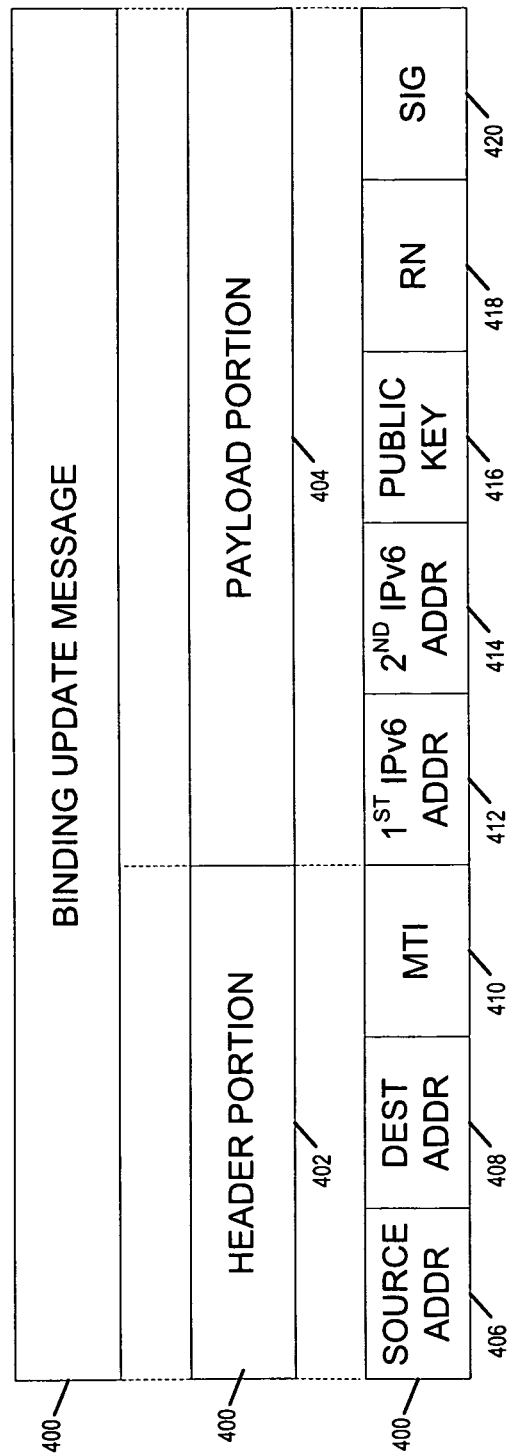
FIG. 4 is a drawing of an exemplary binding update message, used in some embodiments, to communicate an address pair corresponding to a node and information that can be used to validate the address pair and/or validate ownership of the address pair.

FIG. 4 is a drawing of an exemplary binding update message 400, used in some embodiments, to communicate an address pair corresponding to a node and information that can be used to validate the address pair, e.g., as part of a handoff from communicating over a first network using a first address to communicating over a second network using a second address. Exemplary binding update message 400 includes a header portion 402 and a payload portion 404. The header portion 402 includes a source address 406, a destination address 408 and a message type indicator (MTI) 410. The payload portion 404 includes a 1st IPv6 address 412, a 2nd IPv6 address 414, a public key 416, a random number 418, and a signature 420. In some embodiments, additional information is included in the binding update message.

In some embodiments, the public key 416, and random number 418 are used to provide ownership information corresponding to the address pair (412, 414). In some such embodiments, the public key 418 and random number 418 are included as part of a certificate corresponding to address pair (412, 414). In some embodiments, the signature 420 provides ownership information corresponding to the pair of addresses (412, 414). In some such embodiments, the signature is included as part of a certificate corresponding to address pair (412, 414).

1st IPv6 address 412 and 2nd IPv6 address 414 is an address pair for a particular node, e.g., address pair (306, 312) of FIG. 3. Public key 416, random number 418 and signature 420 can be used by the device receiving binding update message 400 to validate the address pair being communicated. The binding update message 400, in some embodiments, includes a pair of IPv6 addresses (412, 414) corresponding to a node transmitting the binding update message, the addresses having been generated based on the public key and random number also communicated in the same binding update message. A node receiving the binding update message should validate the pair of received addresses. This additional validation adds a measure of security, which can be very useful when trying to handoff a communications from an unsecure network to a secure network, e.g., decreasing the likelihood that a rogue node will be able to hijack a communications session.

Figure 5:
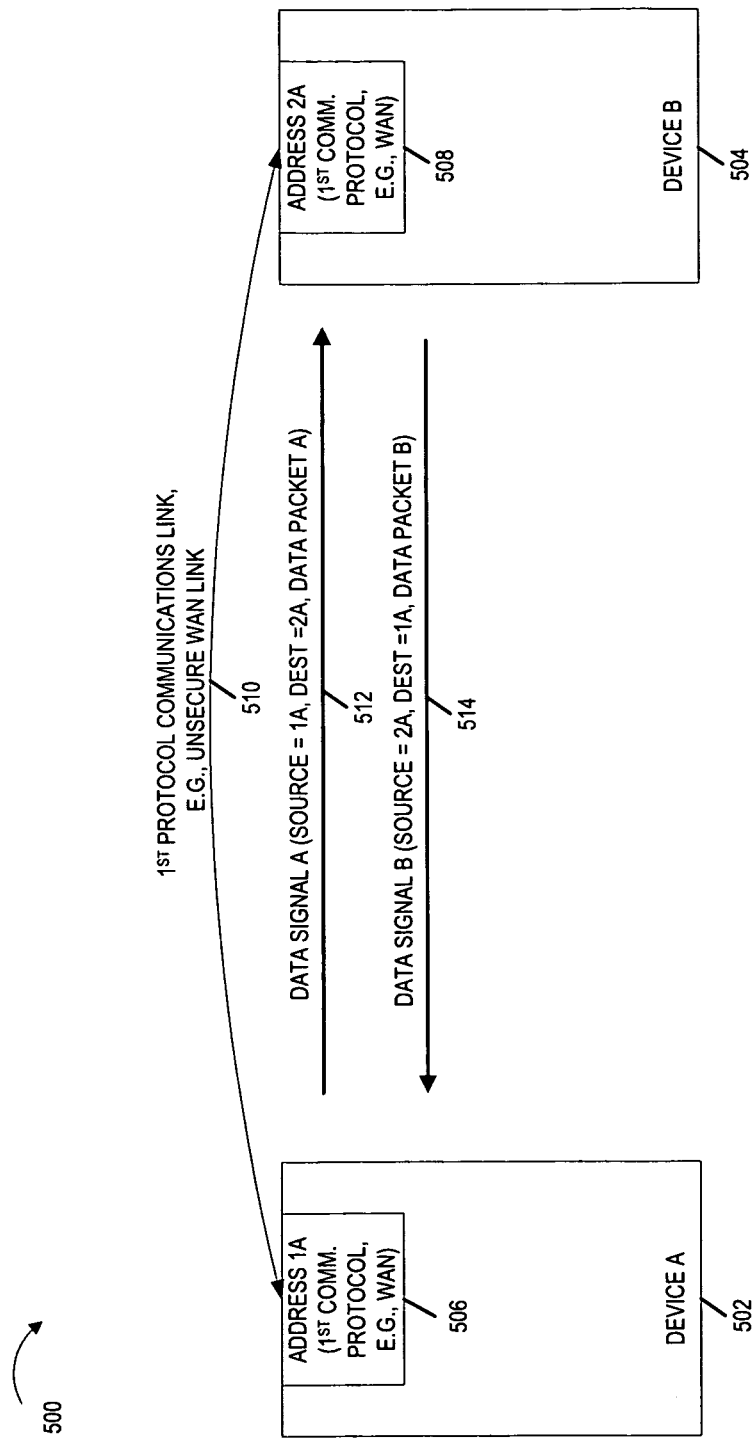
FIG. 5 is a drawing illustrating a pair of wireless communications devices which are communicating over a 1st protocol communications link, e.g., an unsecure WAN link.

FIG. 5 is a drawing 500 illustrating a pair of wireless communications devices (device A 502, device B 504) which are communicating over a 1st protocol communications link 510, e.g., an unsecure WAN link. Device A 502 uses address 1A 506 for its address for this network, e.g. corresponding to a first communications protocol and a WAN network. Device B 504 uses address 2A 508 for its address for this network, e.g. corresponding to the first communications protocol and the WAN network. Device A 502 is aware of its own address, address 1A 506 and the address of device B, address 2A 508. Similarly device B 504 is aware of its own address, address 2A 508 and the address of device A, address 1A 506. Device A 502 generates and sends data signal A 512 over link 510 to device B 504. Data signal A 512 includes a source address=address 1A, a destination address=address 2A, and data packet A. Device B 504 generates and sends data signal B 514 over link 510 to device A 502. Data signal B 514 includes a source address=address 2A, a destination address=address 1A, and data packet B.

Figure 6:
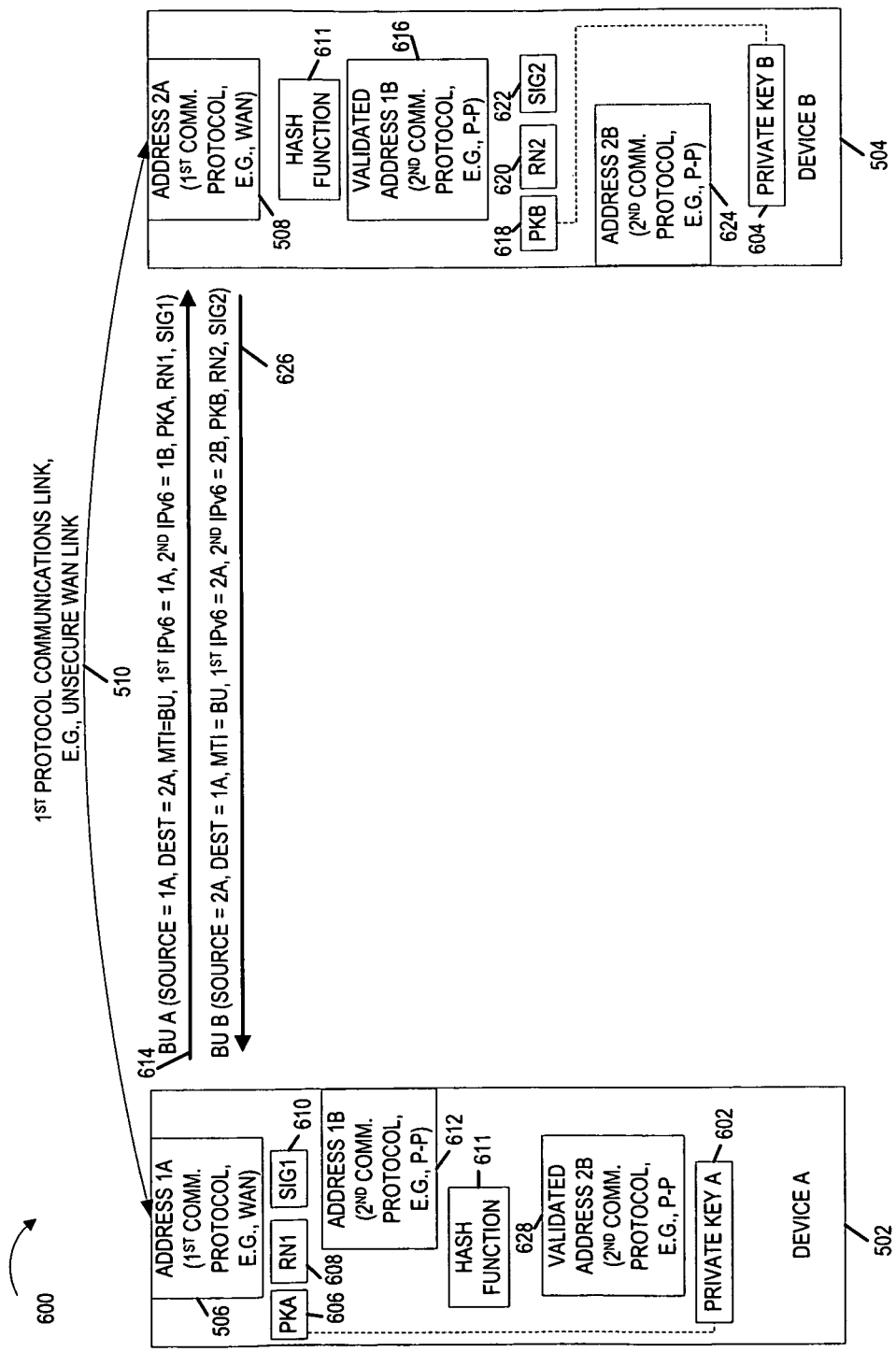
FIG. 6 is a drawing illustrating the exemplary pair of wireless communications devices of FIG. 5 and exemplary binding update messages communicated as part of a handoff.

FIG. 6 is a drawing illustrating the exemplary pair of wireless communications devices (device A 502, device B 504) and exemplary binding update messages communicated as part of a handoff. Device A generates address 1B 612, which corresponds to a second network and second communications protocol, e.g., a peer to peer communications network using a peer to peer communications protocol. Address 1B 612 is generated from public key A (PK A) 606, corresponding to private key A 602, random number 1 (RN 1) 608, and hash function 611. Address 1A 506 has also been generated from public key A 606, random number 1 608 and hash function 611. Generating address pair (address 1A 506, address 1B 612) includes generating a first M bit value and a second M bit value from RN 1 608 and PK A 606 corresponding to private key A 602, where M is a positive integer. In some embodiments, M is 64.

Device A 502 generates a binding update message A 614 and transmits it to device B 504. Binding update message 614 includes a source address=address 1A 506, a destination address=address 2A 508, a message type indicator=binding update, a 1st IPv6 address=address 1A 506, a 2nd IPv6 address=address 1B 612, a public key value=public key A 606, a random number value=random number 1 608, and a signature=signature 1 610. The signature (SIG 1) 610 has been generated from private key A 602.

Device B 504 receives the binding update message A 614 and recovers the information being communicated. Then, device B 504 performs an address validation operation using the communicated random number, RN 1 608, communicated public key, PK A 606, and hash function 611 to determine the validity of the first and second communicated IPv6 addresses (address 1A 506, address 1B 612). In some embodiments, as part of the address validation device B 504 uses received public key A 606, received RN1 608 and hash function 611 to generate a pair of addresses. Then the generated pair of addresses are compared to the two IPv6 addresses communicated in the BU message 614. The received signature, SIG 1 610, is also used in combination with received public key A 606 to confirm that the sender of the signaling message 614 owns the private key, private key A 602, corresponding to PK A 606. In this example, consider that the address pair validation is successful, and device B 504 stores address 1B as validated address 1B 616, which device B 504 can use when signaling on the peer to peer communications network using the second communications protocol.

Device B 504 generates address 2B 624, which corresponds to the second network and second communications protocol, e.g., the peer to peer communications network using the peer to peer communications protocol. Address 2B 624 is generated from public key B (PK B) 618, corresponding to private key B 604, random number 2 (RN 2) 620, and hash function 611. Address 2A 508 has also been generated from public key B 618, random number 2 620, and hash function 611. Device B 504 generates a binding update message B 626 and transmits it to device A 502. Binding update message B 626 includes a source address=address 2A 508, a destination address=address 1A 506, a message type indicator=binding update, a 1st IPv6 address=address 2A 508, a 2nd IPv6 address=address 2B 624, a public key value=public key B 618, a random number value=random number 2 620, and a signature=signature 2 (SIG 2) 622. Signature 2 622 has been generated by device B 504 from private key B 604.

Device A 502 receives the binding update message B 626 and recovers the information being communicated. Then, device A 502 performs an address validation operation using the communicated random number, RN 2 620, communicated public key, PK B 618, and hash function 611 to determine the validity of the first and second communicated IPv6 addresses (address 2A 508, address 2B 624). In some embodiments, determining the validity of the first second communicated IPv6 addresses in message 626 includes generating a pair of IPv6 addresses from the received PK B 618, received RN 2 620 and hash function 611, and then comparing the generated pair of addresses to the received pair of addresses communicated in binding update message 626. The received signature, SIG 2 622, is also used to confirm that the sender of the signaling message knows the private key, private key B 604, corresponding to communicated public key, PK 2 618. In this example, consider that that the address pair validation is successful, and device A 502 stores address 2B as validated address 2B 628, which device A 502 can use when signaling on the peer to peer communications network using the second communications protocol.

A device knowing its private key is able to generate a valid signature for its binding update message. Therefore, the signature can be used to verify that the device which generated the binding update message actually owns the address pair included in the binding update message and can also be used to confirm the message integrity, e.g., that the content was not altered after generation of the message. This feature is useful in maintaining security and preventing hijacking of a communications session by a third device attempting to impersonate one of device A 502 and device B 504.

Figure 7:
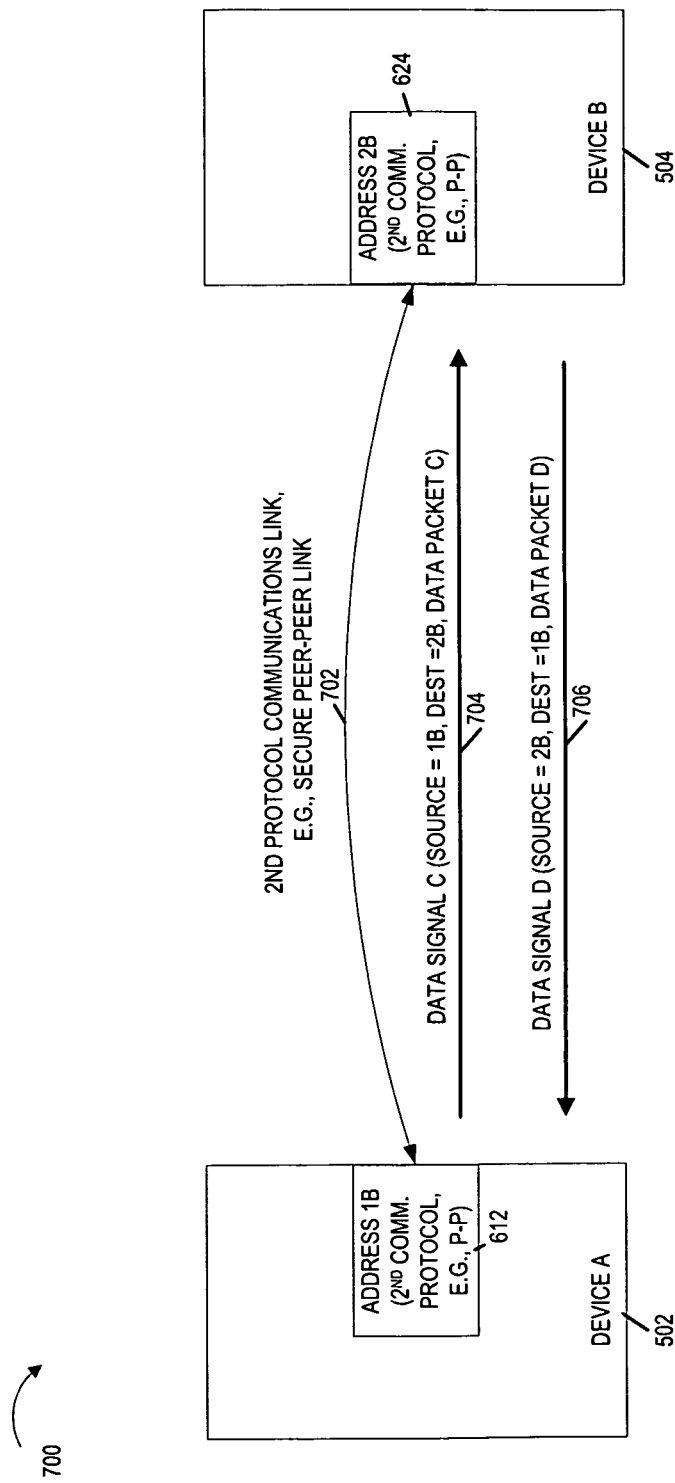
FIG. 7 is a drawing illustrating the exemplary pair of wireless communications devices of FIG. 5 which are communicating over a 2nd protocol communications link, e.g., a secure peer to peer link.

FIG. 7 is a drawing 700 illustrating the exemplary pair of wireless communications devices (device A 502, device B 504) which are communicating over a 2nd protocol communications link 702, e.g., a secure peer to peer link. Device A 502 uses address 1B 612 for its address for this network, e.g. corresponding to the second communications protocol and a peer to peer network. Device B 504 uses address 2B 624 for its address for this network, e.g. corresponding to the second communications protocol and the peer to peer network. Device A 502 is aware of its own address, address 1B 612 and the address of device B, address 2B 624, which it has previously validated and stored as address 2B 628. Similarly device B 504 is aware of its own address, address 2B 624 and the address of device A, address 1B 612, which it has previously validated and stored as address 1B 616. Device A 502 generates and sends data signal C 704 over link 702 to device B 504. Data signal C 704 includes a source address=address 1B, a destination address=address 2B, and data packet C. Device B 504 generates and sends data signal D 706 over link 702 to device A 502. Data signal D 706 includes a source address=address 2B, a destination address=address 1B, and data packet D.

Figure 8:
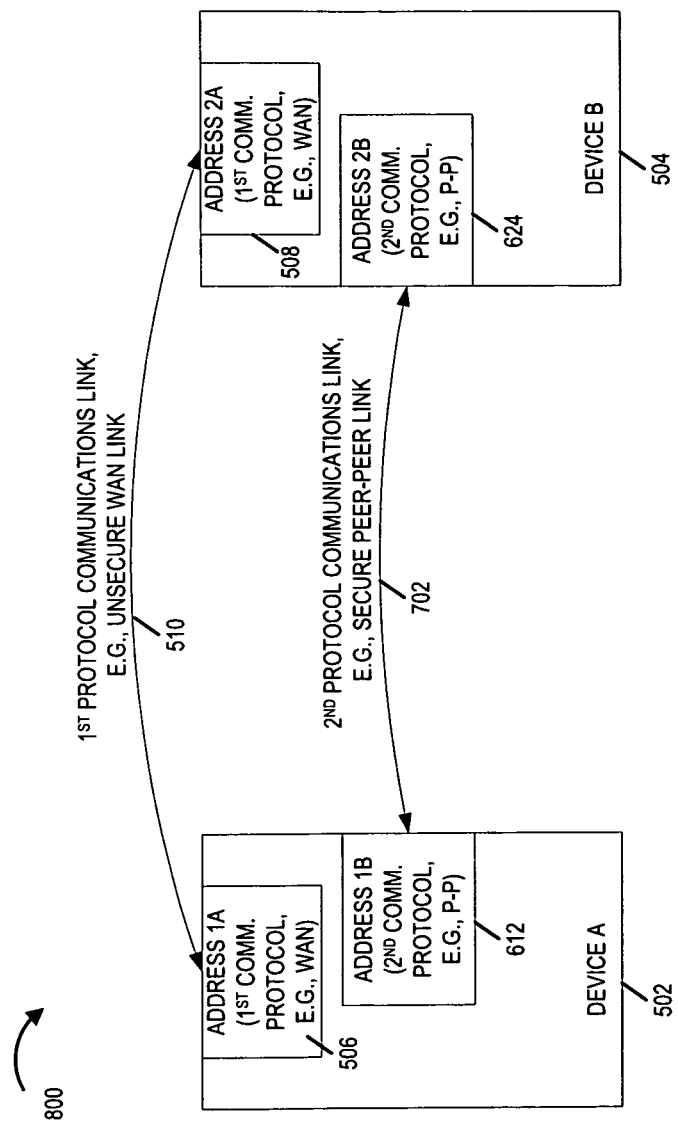
FIG. 8 is a drawing illustrating the exemplary pair of wireless communications devices of FIG. 5 which have previously established multiple communications links including a 1st protocol communications link, e.g., corresponding to an unsecure WAN network, and 2nd protocol communications link, e.g., corresponding to a secure peer to peer network, each link being associated with different addresses.

FIG. 8 is a drawing 800 illustrating the exemplary pair of wireless communications devices (device A 502, device B 504) which have previously established multiple communications links (1st protocol communications link 510, e.g., corresponding to an unsecure WAN network, 2nd protocol communications link 702, e.g., corresponding to a secure peer to peer network). Part of the establishment included communication and validation of a pair of addresses corresponding to a single device. Device A 502 uses address 1A 506 as its address when communicating over link 510 and address 1B 612 as its address when communicating over link 702. Device B 504 uses address 2A 508 as its address when communicating over link 510 and address 2B 624 as its address when communicating over link 702. The devices (502, 504) may, and sometimes do, switch back and forth between links, e.g., as a function of loading conditions and/or interference levels.

Figure 9:
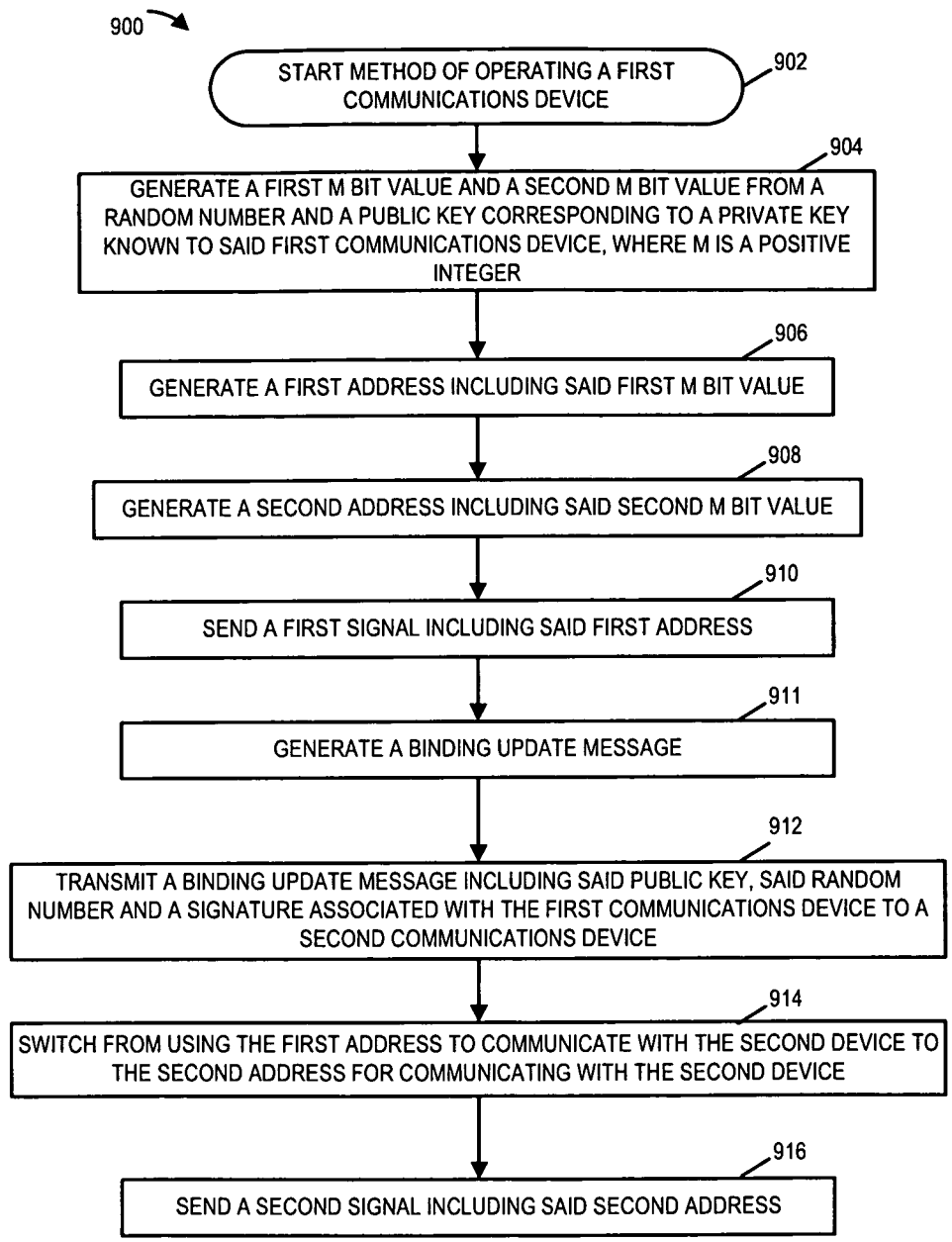
FIG. 9 is a flowchart of an exemplary method of operating a first communications device in accordance with an exemplary embodiment.

FIG. 9 is a flowchart 900 of an exemplary method of operating a first communications device in accordance with an exemplary embodiment. Operation starts in step 902 where the first communications device is powered on and initialized. Operation proceeds from start step 902 to step 904.

In step 904 the first communications device generates a first M bit value and a second M bit value from a random number and a public key corresponding to a private key known to said first communications device, where M is a positive integer. Operation proceeds from step 904 to step 906.

In step 906 the first communications device generates a first address including said first M bit value. Operation proceeds from step 906 to step 908, in which the first communications device generates a second address including said second M bit value. In some embodiments, M is 64 and the first and second addresses are IPv6 addresses. In some embodiments, the first address includes said first M bit value as a user portion of said first address and said second address includes said second M bit value as a user portion of said second address. Operation proceeds from step 908 to step 910.

In step 910 the first communications device sends a first signal including said first address. Operation proceeds from step 910 to step 911. In step 911 the first communications device generates a binding update message including said first address, said second address, said public key, said random number and a signature associated with the first communications device. Operation proceeds from step 911 to step 912. In step 912 the first communications device transmits the generated binding update message including said public key, said random number and a signature associated with the first communications device to a second communications device. Operation proceeds from step 912 to step 914. In step 914 the first communications device switches from using the first address to communicate with the second device to the second address for communicating with the second device. In some embodiments, said switching includes changing from using the first address as a source address for packets sent to the second device to using the second address as a source address for packets sent to the second device.

Operation proceeds from step 914 to step 916. In step 916 the first communications device sends a second signal including said second address.

Consider one example of a method in accordance with flowchart 900 of FIG. 9 based on the signaling described with respect to FIGS. 5-8. Consider for the purposes of this example, that the first communications device is device A 502 and the second communications device is device B 504. With regard to step 904, the random number is RN 1 608, the public key is PK A 606 corresponding to private key A 602. With regard to step 906, the generated first address is address 1A 506. With regard to step 908 the generated second address is address 1B 612. With regard to step 910 the first signal is data signal 512. With regard to step 911 and step 912 the generated/transmitted binding update message is binding update message A 614. With regard to the switch of step 914, FIG. 5 illustrates communications using the first address prior to the switch while FIG. 7 illustrates communications using the second address after the switch. With regard to step 916 the second signal is data signal C 704.

Figure 10:
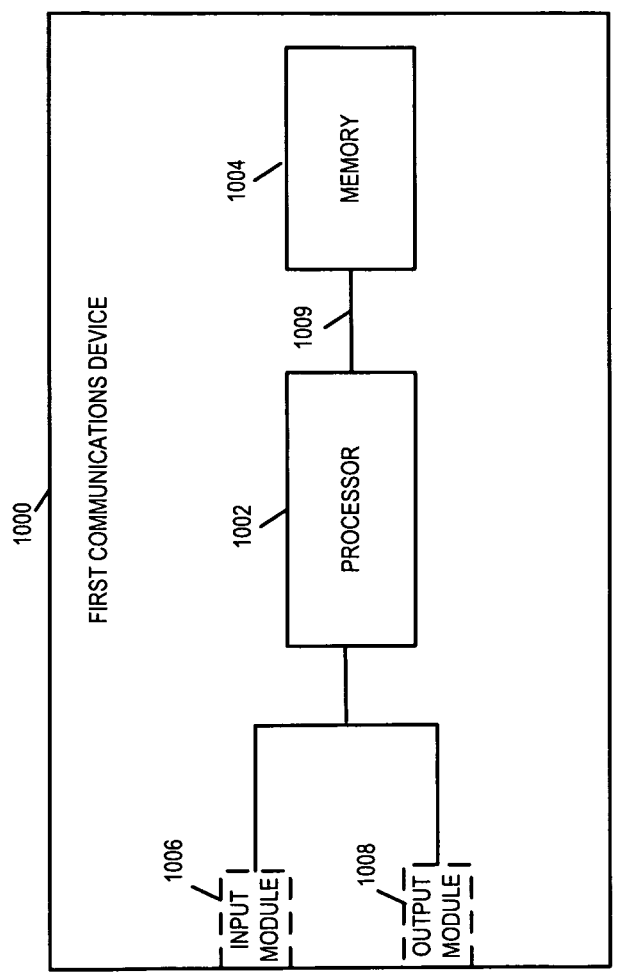
FIG. 10 is a drawing of an exemplary first communications device in accordance with an exemplary embodiment.

FIG. 10 is a drawing of an exemplary first communications device 1000 in accordance with an exemplary embodiment. Exemplary first communications device 1000 implements a method in accordance with flowchart 900 of FIG. 9. First communications device 1000 is, e.g., one of any of: communications devices (102, 104, 106, 108, 110, 112) of FIG. 1, communications device 502 of FIGS. 5-8, communications device 504 of FIGS. 5-8, communications device 1602 of FIG. 16 and communications device 1604 of FIG. 16.

First communications device 1000 includes a processor 1002 and memory 1004 coupled together via a bus 1009 over which the various elements (1002, 1004) may interchange data and information. First communications device 1000 further includes an input module 1006 and an output module 1008 which may be coupled to processor 1002 as shown. However, in some embodiments, the input module 1006 and output module 1008 are located internal to the processor 1002. Input module 1006 can receive input signals. Input module 1006 can, and in some embodiments does, include a wireless receiver and/or a wired or optical input interface for receiving input. Output module 1008 may include, and in some embodiments does include, a wireless transmitter and/or a wired or optical output interface for transmitting output.

Processor 1002 is configured to: generate a first M bit value and a second M bit value from a random number and a public key corresponding to a private key known to said first communication device, where M is a positive integer; generate a first address including said first M bit value; generate a second address including said second M bit value; send a first signal including said first address; and send a second signal including said second address. In some embodiments, M is 64, and said first and second addresses are IPv6 addresses. In some embodiments, said first address includes said first M bit value as a user portion of said first address; and said second address includes said second M bit value as a user portion of said second address.

Processor 1002, in some embodiments, is further configured to: transmit a binding update message including said public key, said random number and a signature associated with the first communications device to a second communications device. In various embodiments, processor 1002 is further configured to: switch from using the first address to communicate with the second device to the second address for communicating with the second device. In some such embodiments, processor 1002 is configured to change from using the first address as a source address for packets sent to the second device to using the second address as a source address for packets sent to the second device as part of being configured to switch.

Figure 11:
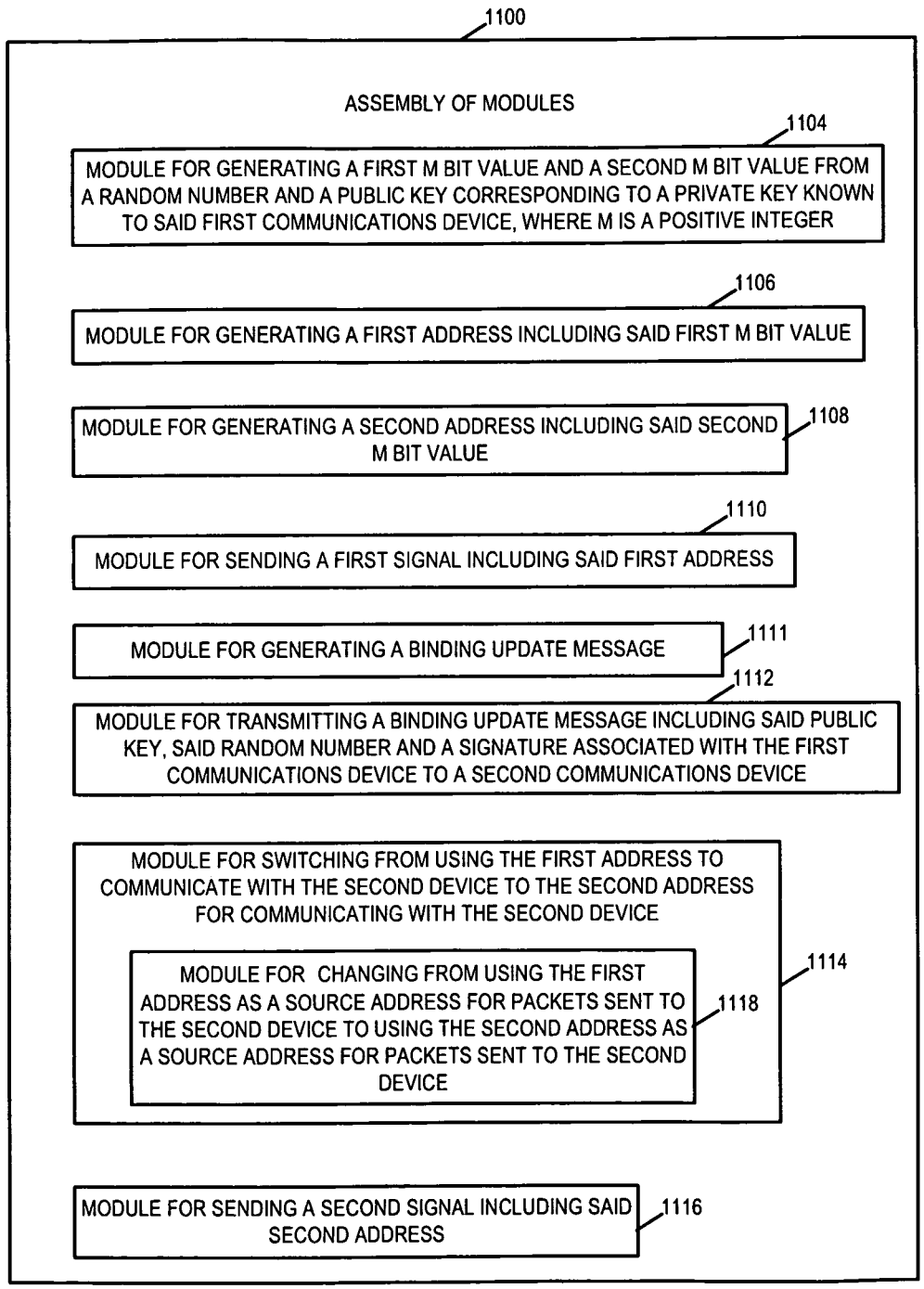
FIG. 11 is an assembly of modules which can, and in some embodiments are, used in the first communications device illustrated in FIG. 10.

FIG. 11 is an assembly of modules 1100 which can, and in some embodiments are, used in the first communications device 1000 illustrated in FIG. 10. The modules in the assembly 1100 can be implemented in hardware within the processor 1002 of FIG. 10, e.g., as individual circuits. Alternatively, the modules may be implemented in software and stored in the memory 1004 of the first communications device 1000 shown in FIG. 10. While shown in the FIG. 10 embodiment as a single processor, e.g., computer, it should be appreciated that the processor 1002 may be implemented as one or more processors, e.g., computers. When implemented in software the modules include code, which when executed by the processor, configure the processor, e.g., computer, 1002 to implement the function corresponding to the module. In embodiments where the assembly of modules 1000 is stored in the memory 1004, the memory 1004 is a computer program product comprising a computer readable medium comprising code, e.g., individual code for each module, for causing at least one computer, e.g., processor 1002, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 11 control and/or configure the first communications device 1000 or elements therein such as the processor 1002, to perform the functions of the corresponding steps illustrated in the method flowchart 900 of FIG. 9.

As illustrated in FIG. 11, the assembly of modules 1100 includes: a module 1104 for generating a first M bit value and a second M bit value from a random number and a public key corresponding to a private key known to said first communication device, where M is a positive integer; a module 1106 for generating a first address including said first M bit value; a module 1108 for generating a second address including said second M bit value; a module 1110 for sending a first signal including said first address; and a module 1116 for sending a second signal including said second address. In some embodiments, M is 64, and said first and second addresses are IPv6 addresses. In some embodiments, said first address includes said first M bit value as a user portion of said first address; and said second address includes said second M bit value as a user portion of said second address.

In some embodiments, assembly of modules 1100 includes one or more of: a module 1111 for generating a binding update message, a module 1112 for transmitting a binding update message including said public key, said random number and a signature associated with the first communications device to a second communications device, and a module 1114 for switching from using the first address to communicate with the second device to the second address for communicating with the second device. In various embodiments, module 1114 for switching includes a module 1118 for changing from using the first address as a source address for packets sent to the second device to using the second address as a source address for packets sent to the second device. In some embodiments, a binding update message which is generated by module 1111 and transmitted by module 1112 includes said first address and said second address.

Figure 12:
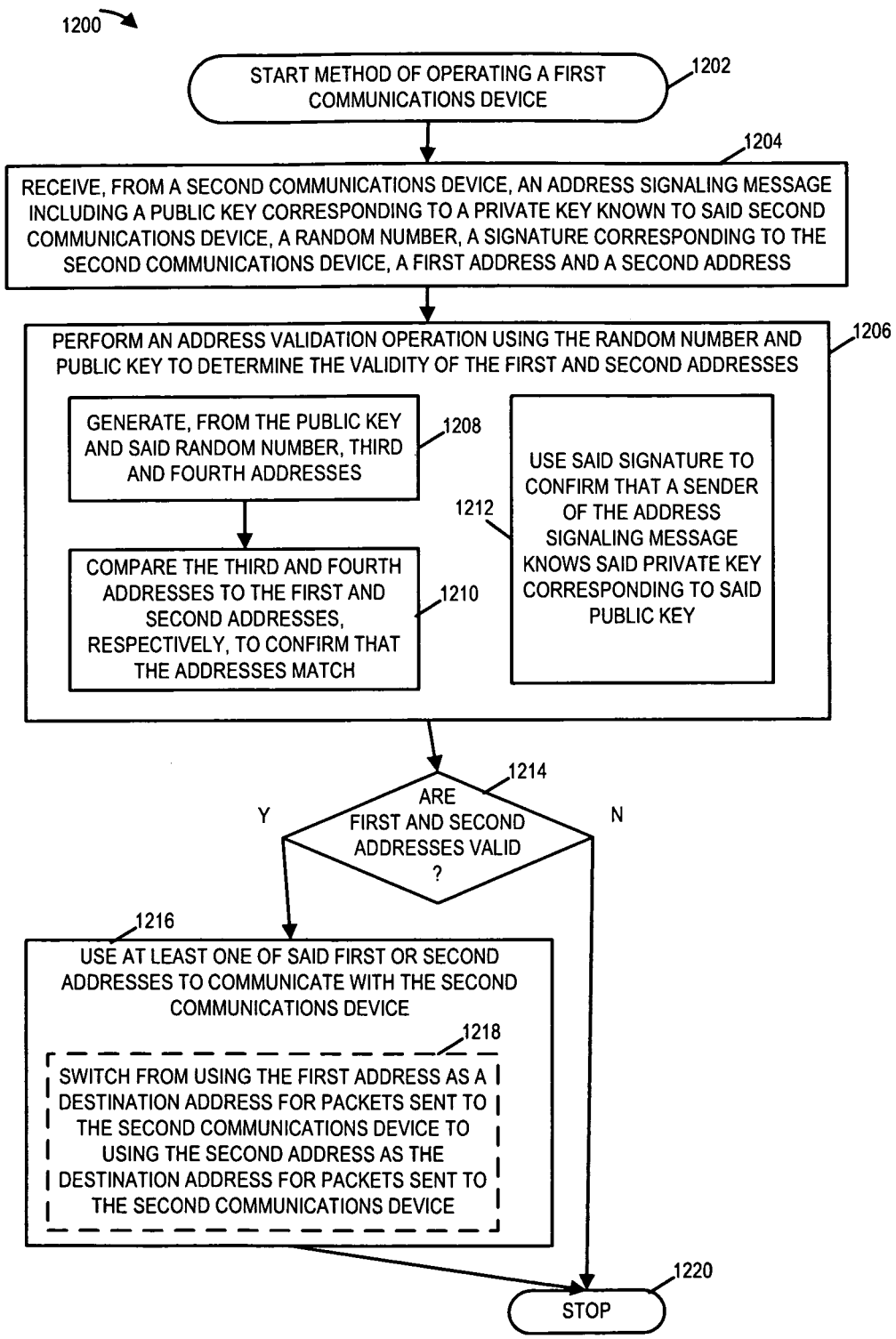
FIG. 12 is a flowchart of an exemplary method of operating a first communications device in accordance with an exemplary embodiment.

FIG. 12 is a flowchart 1200 of an exemplary method of operating a first communications device in accordance with an exemplary embodiment. Operation starts in step 1202 where the first communications device is powered on and initialized. Operation proceeds from start step 1202 to step 1204. In step 1204 the first communications device receives, from a second communications device, an address signaling message including a public key corresponding to a private key known to said second communications device, a random number, a signature corresponding to the second communications device, a first address and a second address. Operation proceeds from step 1204 to step 1206.

In step 1206 the first communications device performs an address validation operation using the random number and public key to determine the validity of the first and second addresses. The address validation operation further includes using said signature. Step 1206 may, and sometimes does, include one or more of sub-steps 1208, 1210 and 1212. In sub-step 1208 the first communications device generates from the public key and said random number, third and fourth addresses. Then in sub-step 1210 the first communications device compares the third and fourth addresses to the first and second addresses, respectively to confirm that the addresses match. In sub-step 1212 the first communications device uses said signature to confirm that a sender of the address signaling message knows said private key corresponding to said public key.

Operation proceeds from step 1206 to step 1214. In step 1214, if the first and second addresses are valid, then operation proceeds from step 1214 to step 1216; otherwise operation proceeds from step 1214 to stop at step 1220.

Returning to step 1216, in step 1216 the first communications device uses at least one of said first or second addresses to communicate with the second communications device. In some embodiments, step 1216 includes sub-step 1218. In sub-step 1218 the first communications device switches from using the first address as a destination address for packets sent to the second communications device to using the second address for packets sent to the second communications device.

Consider one example of a method in accordance with flowchart 1200 of FIG. 12 based on the signaling described with respect to FIGS. 5-8. Consider for the purposes of this example, that the first communications device is device B 504 and the second communications device is device A 502. With regard to step 1204, the address signaling message is binding update message A 614, the public key is PK A 606, the private key is private key A 602, the random number is RN 1 608, the signature is SIG 1 610, the first address is address 1A 506 and the second address is address 1B 612. With regard to step 1206, the address validation operation determines the validity of the first and second IPv6 addresses communicated in message 614, and determines the addresses to be valid. With regard to sub-step 1208, third and fourth address are generated from received public key A 606 and received RN 1 608 using hash function 611. With regard to sub-step 1210 the generated third and fourth addresses are compared to the first and second IPv6 addresses communicated in message 614 and determined to match. With regard to sub-step 1212 the received signature SIG 1 610 is used in combination with received public key PK A 606 to confirm that device A 502 knows private key A 602 corresponding to public key PK A 606. With regard to step 1216, FIG. 7 illustrates the first device communicating with the second device using the second address, e.g., via data signal D 706 which the first device transmits and via data signal C 704 which the first device receives. With regard to sub-step 1218, FIG. 5 illustrates signaling prior to the switch in which the first device uses address 1A 506 as a destination address for packets sent to the second communications device, while FIG. 7 illustrates signaling after the switch in which the first device uses address 1B 612 as a destination address for packets sent to the second communications device.

Figure 13:
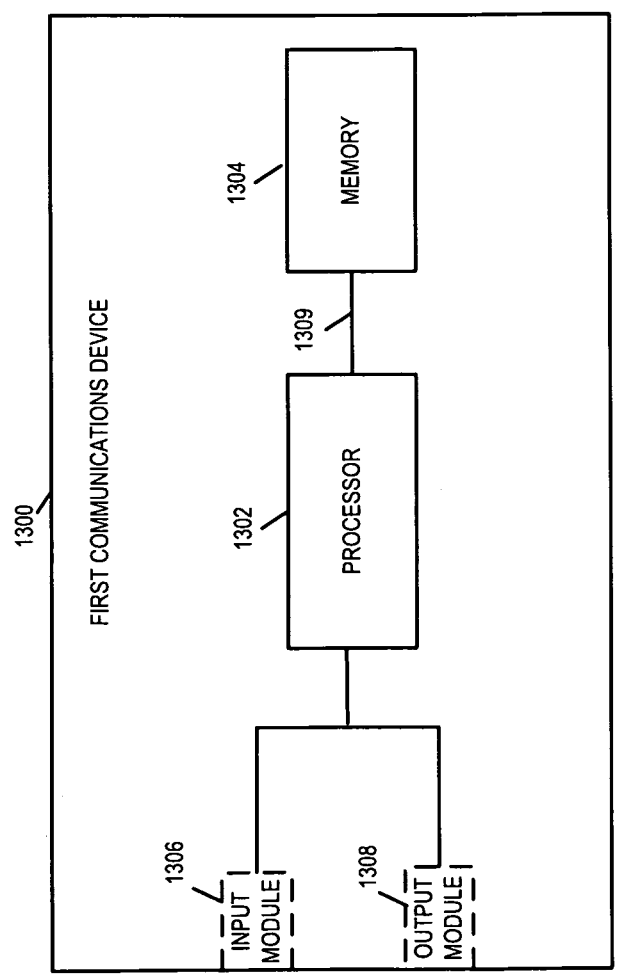
FIG. 13 is a drawing of an exemplary first communications device in accordance with an exemplary embodiment.

FIG. 13 is a drawing of an exemplary first communications device 1300 in accordance with an exemplary embodiment. Exemplary first communications device 1300 implements a method in accordance with flowchart 1200 of FIG. 12. First communications device 1300 is, e.g., one of any of: communications devices (102, 104, 106, 108, 110, 112) of FIG. 1, communications device 502 of FIGS. 5-8, communications device 504 of FIGS. 5-8, communications device 1602 of FIG. 16 and communications device 1604 of FIG. 16.

First communications device 1300 includes a processor 1302 and memory 1304 coupled together via a bus 1309 over which the various elements (1302, 1304) may interchange data and information. First communications device 1300 further includes an input module 1306 and an output module 1308 which may be coupled to processor 1302 as shown. However, in some embodiments, the input module 1306 and output module 1308 are located internal to the processor 1302. Input module 1306 can receive input signals. Input module 1306 can, and in some embodiments does, include a wireless receiver and/or a wired or optical input interface for receiving input. Output module 908 may include, and in some embodiments does include, a wireless transmitter and/or a wired or optical output interface for transmitting output.

Processor 1302 is configured to: receive, from a second communications device, an address signaling message including a public key corresponding to private key known to the second communications device, a random number and a signature corresponding to the second communications device, a first address, and a second address. Processor 1302 is further configured to perform an address validation operation using the random number and public key to determine the validity of the first and second addresses. Processor 1302 is further configured to use, when said first and second addresses are determined to be valid, at least one of said first or second addresses to communicate with said second communications device.

In some embodiments, processor 1302 is further configured to use said signature as part of being configured to perform an address validation. In various embodiments, processor 1302 is further configured to: generate, from the public key and said random number, third and fourth addresses; and compare the third and fourth addresses to the first and second addresses, respectively to confirm that the addresses match, as part of being configured to perform an address validation. In some embodiments, processor 1302 is further configured to use said signature to confirm that a sender of the address signaling message knows said private key corresponding to said public key, as part of being configured to perform an address validation. Processor 1302 is, in some embodiments, further configured to switch from using the first address as a destination address for packets sent to the second communications node to using the second address as the destination address for packets sent to the second communications node, as part of being configured to use at least one of the first or second addresses.

Figure 14:
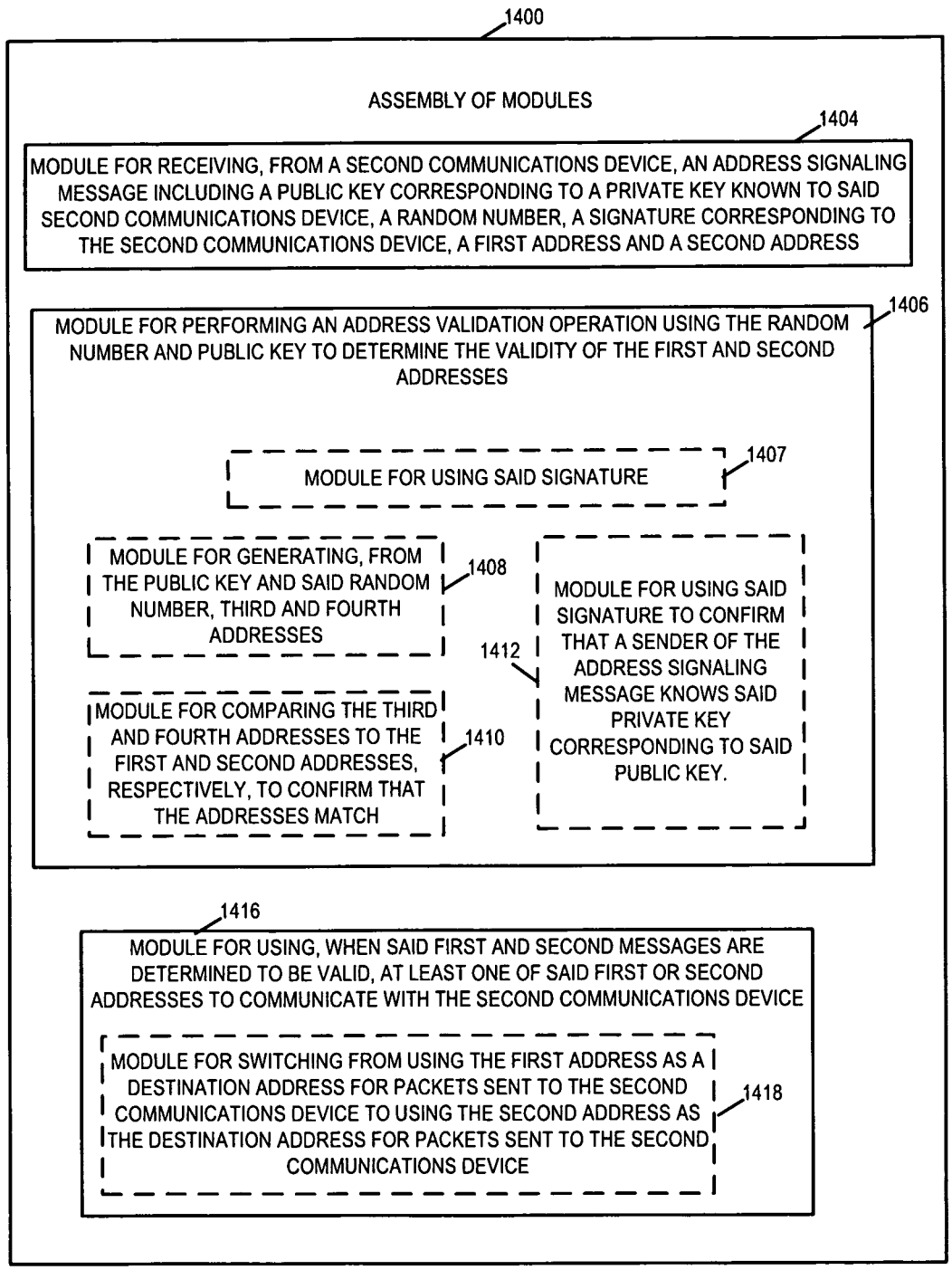
FIG. 14 is an assembly of modules which can, and in some embodiments are, used in the first communications device illustrated in FIG. 13.

FIG. 14 is an assembly of modules 1400 which can, and in some embodiments are, used in the first communications device 1300 illustrated in FIG. 13. The modules in the assembly 1400 can be implemented in hardware within the processor 1302 of FIG. 13, e.g., as individual circuits. Alternatively, the modules may be implemented in software and stored in the memory 1304 of the first communications device 1300 shown in FIG. 13. While shown in the FIG. 13 embodiment as a single processor, e.g., computer, it should be appreciated that the processor 1302 may be implemented as one or more processors, e.g., computers. When implemented in software the modules include code, which when executed by the processor, configure the processor, e.g., computer, 1302 to implement the function corresponding to the module. In embodiments where the assembly of modules 1400 is stored in the memory 1304, the memory 1304 is a computer program product comprising a computer readable medium comprising code, e.g., individual code for each module, for causing at least one computer, e.g., processor 1302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 14 control and/or configure the first communications device 1300 or elements therein such as the processor 1302, to perform the functions of the corresponding steps illustrated in the method flowchart 1200 of FIG. 12.

As illustrated in FIG. 14, the assembly of modules 1400 includes: a module 1404 for receiving, from a second communications device, an address signaling message including a public key corresponding to private key known to the second communications device, a random number and a signature corresponding to the second communications device, a first address, and a second address; and a module 1406 for performing an address validation operation using the random number and public key to determine the validity of the first and second addresses. Assembly of module 1400 further includes a module 1416 for using, when said first and second addresses are determined to be valid, at least one of said first or second addresses to communicate with said second communications device.

In some embodiments, the module 1406 for performing an address validation operation further includes one or more of: a module 1407 for using said signature, a module 1408 for generating, from the public key and said random number, third and fourth addresses; a module 1410 for comparing the third and fourth addresses to the first and second addresses, respectively to confirm that the addresses match; and a module 1412 for using said signature to confirm that a sender of the address signaling message knows said private key corresponding to said public key. In some embodiments, module 1412 is included as part of module 1407. Module 1416, in some embodiments, includes module 1418 for switching from using the first address as a destination address for packets sent to the second communications device to using the second address as the destination address for packets sent to the second communications device.

Various embodiments describe mechanisms which can be used to derive a set of IPv6 addresses and to provide a proof of ownership of a pool of addresses. In various embodiments a strong binding is achieved between the user's certificate and random values so upon validation of a certificate corresponding to multiple addresses a user's ownership of claimed IP address(es) can be confirmed. In some cases a mobile node handles a pair of IPv6 addresses or even a larger number of addresses. This is particularly useful when a mobile node has a pair of addresses such as when a mobile node has a home address (HoA) and a care-of-address (CoA) and/or in the case of a multi-homed node where a node may have a set of IPv6 addresses, e.g., multiple Home addresses corresponding to different domains and/or configured on different interfaces.

In some embodiments, an IPv6 address is obtained from concatenating two sets of bits, which represent a prefix and an interface identifier (IID), respectively. Typically two set of 64 bits each are used, although other breakdowns are also possible and may be used in some embodiments. In various embodiments, IIDs are generated which are to be unique and preferably random, e.g., for privacy purposes.

A description of an exemplary method of generating a pair of IPv6 addresses will now be described. In some embodiments, a couple of 64 bit parameters are generated as follows. A one way hash function (Hash) uses a random 128 bit number (RAN) and a public key (PK) as inputs to generate output. The first 128 bits output from the hash function (Y) are extracted from the resulting hash and divided into two 64 bit IIDs (IID2, IID1). Each IID is then used to configure an IPv6 address. It follows that the verification of the certificate and public key pair ownership automatically asserts ownership of both IPv6 addresses. This assumes, of course, that the RAN has also been sent to the corresponding node. The two steps are described in the following:

(Y)=First [128, Hash(PK|RAN)]
IID1=First [64, (Y)]

It follows immediately that IID2 is the last 64 bits extracted from (Y), i.e., the remaining portion after extracting IID1.

IID2=Second[64, (Y)]

Another exemplary method to generate a pair of IPv6 addresses incorporates a slightly modified scheme to the approach described above. In such an approach IID1 is equal to XOR of the first 64 bits, e.g., rightmost bits, from the output of a one-way hash function, which takes (Y) as the input, with the remaining, i.e., leftmost 64 bits. Note that in this case the hash function would take as input the parameter (Y). The steps are described as follows:

(Y)=First [128, Hash(PK|RAN)]
IID1=(First [64, Hash(Y)]) XOR (Second [64, Hash(Y)])

As for IID2, it should be computed in the following way:

IID2=First [64, Hash(RAN XOR (Y)]

In some embodiments, PK is replaced with the hash of the certificate itself, and the certificate is certified by a third party. In some embodiments, different hash functions are used for at least some different hash calculations in the steps of the method.

Figure 15:
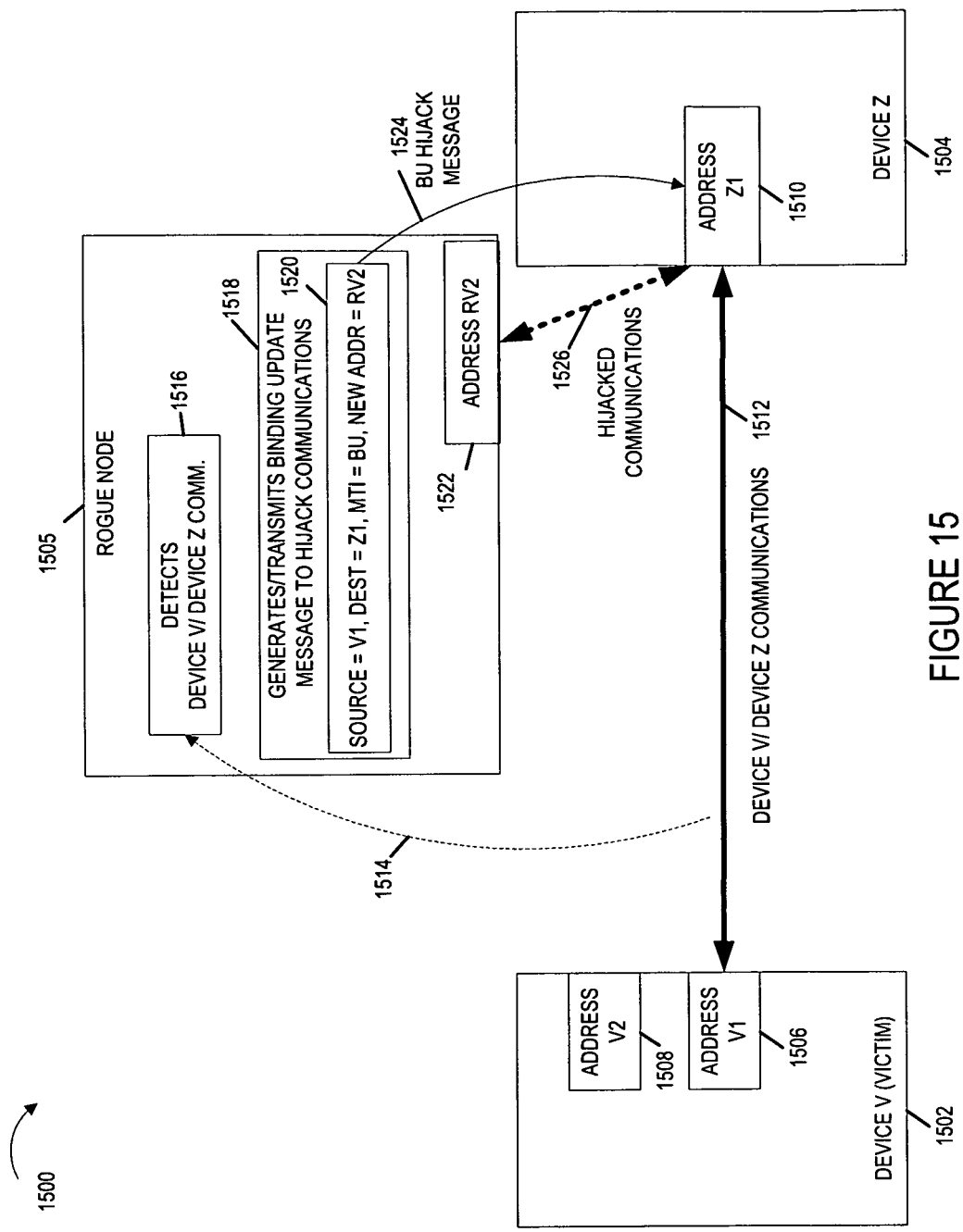
FIG. 15 is a drawing illustrating two devices which are communicating and a rogue node which hijacks the communications.

FIG. 15 is a drawing 1500 illustrating two devices (device V 1502, device Z 1504) which are communicating and a rogue node (1505) which hijacks the communications. Exemplary node V 1502 uses address V1 1506 to communicate with device Z 1504 which is using address Z1 1510 as its address. The device V/device Z communications are indicated by bi-directional arrow 1512. Rouge node 1505 monitors the communications 1512 as indicated by arrow 1514. Rogue node 1505 detects the device V/device Z communications, as indicated by block 1516. Rogue node 1505 decides to pose as device V and attempt to hijack the communications. Rogue node 1505 generates and transmits a binding update message to hijack the communications as indicated by block 1518. Binding update message 1520 includes a source address=address V1, a destination address=address Z1, a message type indicator=binding update, and a new address=RV2. Address RV2 1522 is actually an address of rogue node 1505 rather than the actual second address of device V, which is address V2 1508. Arrow 1524 indicates the generated binding update hijack message is transmitted from rogue node 1505 to device Z 1504.

In this example, device Z 1504, thinks that the binding update message was sent from device V 1502 and that device V 1502 desires to change its address to address RV2 1522. Device Z 1504 implements the change and now communicates with rogue node 1505 instead of device V 1502 as indicated by dashed bi-directional arrow 1526. Device Z 1504 thinks that it is still communicating with device V 1502. Device V 1502 loses communications and has been victimized by rogue node 1505.

Figure 16:
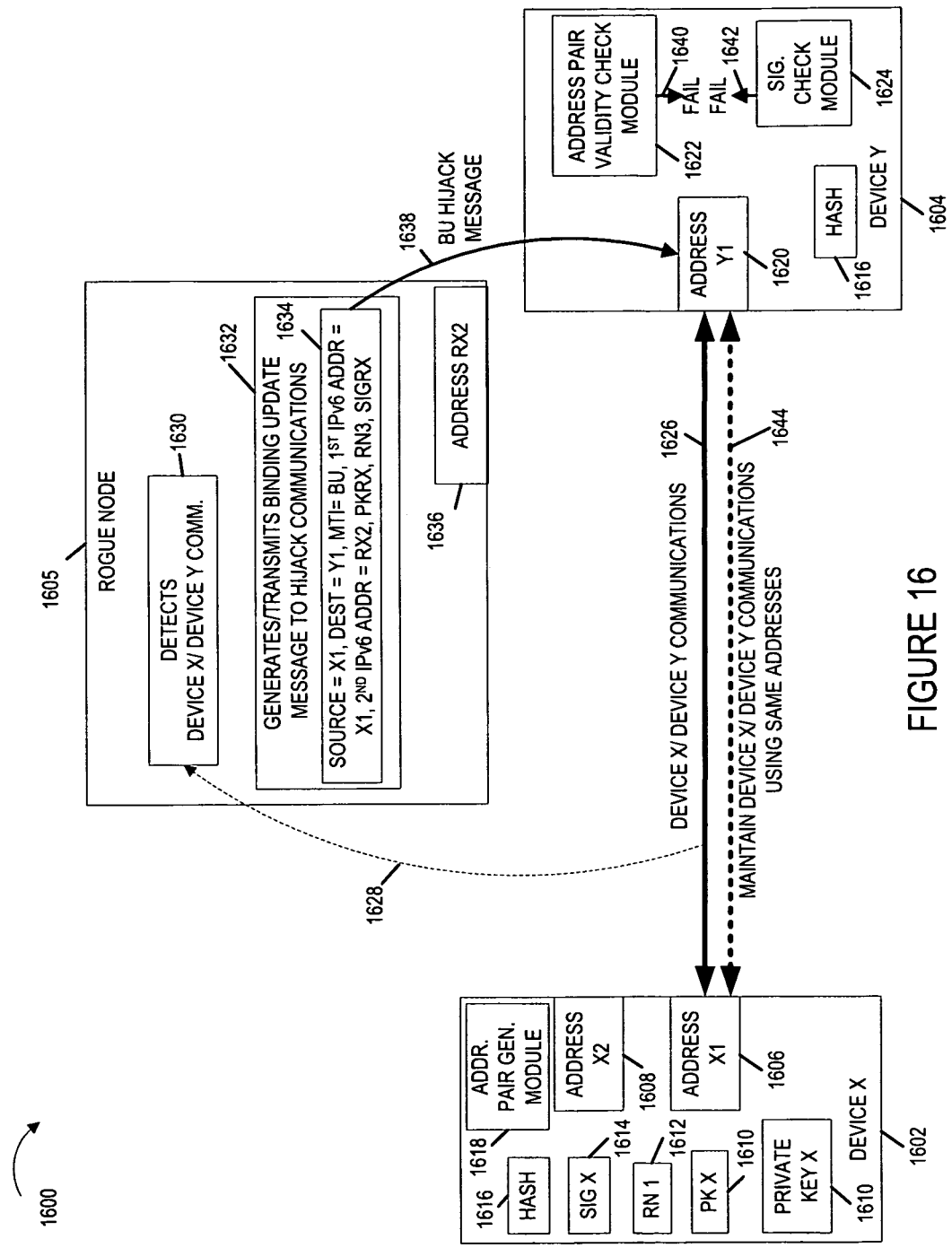
FIG. 16 is a drawing illustrating two devices, implemented in accordance with an exemplary embodiment, which are communicating and a rogue node which unsuccessfully attempts to hijack the communications.

FIG. 16 is a drawing 1600 illustrating two devices (device X 1602, device Y 1604) which are communicating and a rogue node 1605 which attempts to hijack the communications. The two devices (1602, 1604) are implemented in accordance with an exemplary embodiment to generate sets of addresses, provide ownership information regarding the generated sets of addresses, validate communicated sets of addresses, generate signatures and check signatures.

In this example, device X 1602 includes an address pair generation module 1618, a hash function 1616, a random number which is RN 1 1612, a public key which is PK X 1610, and a corresponding private key which is private key X 1610. The address pair generation module 1618 uses the hash 1616, RN 1 1612, and PK X 1610 to generate address pair (address X1 1606, address X2 1608). In addition device X 1602 uses private key 1610 to generate signature SIG X 1614.

Device X 1602 is currently using its address X1 1606 to communicate with device Y 1604, which is using its address Y1 1620. The device X/device Y communications are indicated by solid bi-directional arrow 1626. If device X 1602 wanted to change its address from address X1 1606 to address X2 1608, device X would generate a binding update message (source address=address X1, destination address=Y1, MTI=Binding Update, 1st IPv6 address=address X1, 2nd IPv6 address=address X2, public key=PK X, random number=RN 1, signature=SIG X), and transmit the generated binding update message to device Y which would validate the address pair and signature before transitioning to the new address X2 1608 for device X. However, in this example, device X 1602 wishes to remain on address X1 1606 and does not send such a binding update message.

In this example, rogue node 1605 has been monitoring the device X/device Y communications 1626 as indicated by arrow 1628. Rogue node 1605 detects the device X/device Y communications as indicated by block 1630 and decides to attempt to hijack the communications. Rogue node 1605 generates and transmits a binding update message to attempt to hijack the communications. Binding update message 1634 includes source address=address X1, destination address=Y1, MTI=Binding Update, 1st IPV6 address=address X1, 2nd IPv6 address=address RX2, public key=PK RX, random number=RN 3, signature=SIG RX. Arrow 1638 indicates that the binding update hijack message is communicated from rogue node 1605 to device Y 1604.

Device Y includes hash function 1616, an address pair validity check module 1640, and a signature check module 1624. The address pair validity check module 1622 uses the hash function 1616, the received public key PKRX, and the received random number RN 3 to generate a pair of addresses, and then compares the generated pair of addresses to the received pair of addresses (X1, RX2) from the received binding update message. In this example, the address pair validity check fails as indicated by fail output 1640. In addition, the signature check module 1642 uses the received public key PK RX to check the validity of the signature SIGRX and determines that the signature check fails as indicated by fail output 1642. As a result of the failures (1640, 1642) device Y 1604 does not accept the address change from address X1 1606 to address RX2 1636, and the communications hijacking attempt by rogue node 1605 is a failure. Bi-directional dashed line arrow 1644 indicates that device X/device Y communications are maintained using addresses X1 1606 and address Y1 1620 following the unsuccessful hijacking attempt. In this example, both checks failed; however, if one check had passed and the other check had failed, device Y 1604 would still not have switched to the rogue address RX2 1636.

The techniques of various embodiments may be implemented using software, hardware and/or a combination of software and hardware. Various embodiments are directed to apparatus, e.g., mobile nodes such as mobile access terminals, base stations including one or more attachment points, relay stations, and/or communications systems. Various embodiments are also directed to methods, e.g., method of controlling and/or operating relay stations, mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine, e.g., computer, to implement one or more steps of a method. Various features are directed to novel messages and/or the use of novel messages. The messages are generated, stored and/or communicated. As part of the communications processes one or more of the messages are stored prior to transmission and stored upon receipt. Thus, some features are directed to a memory device, e.g., computer readable medium, having stored thereon one or more of the messages described in the present application. In many cases the messages provide efficiency in terms of their data structure and/or other benefits, over other message formats which might be used, such as the ability to easily identify and access some information in the message.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, generating a first M bit value and a second M bit value from a random number and a public key corresponding to a private key known to said first communication device, where M is a positive integer; generating a first address including said first M bit value; generating a second address including said second M bit value; sending a first signal including said first address; and sending a second signal including said second address, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals which may be mobile devices, base stations, and/or relay stations are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between mobile nodes, between mobile nodes and relay stations, between access nodes and mobile nodes, between access nodes and relay station, and/or between relay stations and mobile nodes. In some embodiments the access nodes are implemented as base stations which establish communications links with mobile nodes and/or relay stations using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device, the method comprising:
   generating, at the first communications device, a first M bit value and a second M bit value from a random number and a public key corresponding to a private key known to said first communications device, where M is a positive integer;
   generating, at the first communications device, a first address including said first M bit value, the first address for communicating with a second communications device via a first communications protocol;
   generating, at the first communications device, a second address including said second M bit value, the second address for communicating with the second communications device via a second communications protocol;
   sending, from the first communications device, a first signal including said generated first address to the second communications device via the first communications protocol; and
   sending, from the first communications device, a second signal including said generated second address to the second communications device via the second communications protocol.

2. The method of claim 1, wherein M is 64, and wherein said first and second addresses are IPv6 addresses.

3. The method of claim 1,
   wherein said first address includes said first M bit value as a user portion of said first address; and
   wherein said second address includes said second M bit value as a user portion of said second address.

4. The method of claim 1, further comprising:
   transmitting a binding update message including said public key, said random number, and a signature associated with the first communications device to the second communications device.

5. The method of claim 4, further comprising:
   switching from using the first address to communicate with the second communications device via the first communications protocol to the second address for communicating with the second communications device via the second communications protocol.

6. The method of claim 5, wherein said switching includes changing from using the first address as a source address for packets sent to the second communications device to using the second address as a source address for packets sent to the second communications device.

7. A first communications device comprising:
   at least one processor configured to:
      generate, at the first communications device, a first M bit value and a second M bit value from a random number and a public key corresponding to a private key known to said first communications device, where M is a positive integer;
      generate, at the first communications device, a first address including said first M bit value, the first address for communicating with a second communications device via a first communications protocol;
      generate, at the first communications device, a second address including said second M bit value, the second address for communicating with the second communications device via a second communications protocol;
      send, from the first communications device, a first signal including said generated first address to the second communications device via the first communications protocol; and
      send, from the first communications device, a second signal including said generated second address to the second communications device via the second communications protocol;
   and memory coupled to said at least one processor.

8. The first communications device of claim 7, wherein M is 64, and wherein said first and second addresses are IPv6 addresses.

9. The first communications device of claim 7,
   wherein said first address includes said first M bit value as a user portion of said first address; and
   wherein said second address includes said second M bit value as a user portion of said second address.

10. The first communications device of claim 7, wherein said at least one processor is further configured to:
    transmit a binding update message including said public key, said random number, and a signature associated with the first communications device to the second communications device.

11. A first communications device comprising:
    means for generating, at the first communications device, a first M bit value and a second M bit value from a random number and a public key corresponding to a private key known to said first communications device, where M is a positive integer;
    means for generating, at the first communications device, a first address including said first M bit value, the first address for communicating with a second communications device via a first communications protocol;
    means for generating, at the first communications device, a second address including said second M bit value, the second address for communicating with the second communications device via a second communications protocol;

means for sending, from the first communications device, a first signal including said generated first address to the second communications device via the first communications protocol; and means for sending, from the first communications device, a second signal including said generated second address to the second communications device via the second communications protocol.

12. The first communications device of claim 11, wherein M is 64, and wherein said first and second addresses are IPv6 addresses.

13. The first communications device of claim 11,
wherein said first address includes said first M bit value as a user portion of said first address; and
wherein said second address includes said second M bit value as a user portion of said second address.

14. The first communications device of claim 11, further comprising:
means for transmitting a binding update message including said public key, said random number, and a signature associated with the first communications device to the second communications device.

15. A computer program product for use in a first communications device, the computer program product comprising:
a non-transitory computer readable medium comprising:
code for causing at least one computer to generate, at the first communications device, a first M bit value and a second M bit value from a random number and a public key corresponding to a private key known to said first communication device, where M is a positive integer;
code for causing said at least one processor to generate, at the first communications device, a first address including said first M bit value, the first address for communicating with a second communications device via a first communications protocol;
code for causing said at least one processor to generate, at the first communications device, a second address including said second M bit value, the second address for communicating with the second communications device via a second communications protocol;
code for causing said at least one processor to send, from the first communications device, a first signal including said generated first address to the second communications device via the first communications protocol; and
code for causing said at least one processor to send, from the first communications device, a second signal including said generated second address to the second communications device via the second communications protocol.

16. The method of claim 1, wherein the first communications protocol is a wide area network (WAN) communications protocol and the second communications protocol is a peer to peer network communications protocol.

17. The first communications device of claim 7, wherein the first communications protocol is a wide area network (WAN) communications protocol and the second communications protocol is a peer to peer network communications protocol.

18. The first communications device of claim 11, wherein the first communications protocol is a wide area network (WAN) communications protocol and the second communications protocol is a peer to peer network communications protocol.

19. The computer program product of claim 15, wherein the first communications protocol is a wide area network (WAN) communications protocol and the second communications protocol is a peer to peer network communications protocol.

* * * * *